United States Patent [19]

Steigelman et al.

[11] E Re. 29,865

[45] Reissued Dec. 19, 1978

[54] CAST CEMENTED REFRACTORY METAL CARBIDES HAVING IMPROVED SINTERED DENSITY

[75] Inventors: James Q. Steigelman, Athens; Joseph J. Cleveland, Dushore; Richard N. Kleiner, Towanda, all of Pa.; Frank Rymas, St. Clair Shores, Mich.

[73] Assignee: GTE Sylvania Incorporated, Stamford, Conn.

[21] Appl. No.: 860,395

[22] Filed: Dec. 14, 1977

Related U.S. Patent Documents

Reissue of:

[64] Patent No.: 4,003,716
Issued: Jan. 18, 1977
Appl. No.: 488,727
Filed: Jul. 15, 1974

[51] Int. Cl.[2] ..... B22F 3/00; C22C 29/00

[52] U.S. Cl. ..... 75/240; 75/203; 75/204; 75/236; 75/242

[58] Field of Search ..... 75/203, 204, 236, 240, 75/242

[56] References Cited

U.S. PATENT DOCUMENTS

| | | | |
|---|---|---|---|
| 3,403,009 | 9/1968 | Bergstrom | 75/204 |
| 3,677,722 | 7/1972 | Rymas | 75/204 |

FOREIGN PATENT DOCUMENTS

| | | |
|---|---|---|
| 931096 | 7/1963 | United Kingdom. |
| 1274211 | 5/1972 | United Kingdom. |
| 1274212 | 5/1972 | United Kingdom. |

*Primary Examiner*—Brooks H. Hunt
*Attorney, Agent, or Firm*—John C. Fox

[57] ABSTRACT

Cemented carbide articles produced by tape casting a slurry of ingredients including organic resins and plasticizers, forming the cast tape into a desired shape and firing the tape, are improved by eliminating carbonaceous residue-forming ingredients from the organic portion of the slurry, resulting in reduced porosity of the fired article.

13 Claims, No Drawings

CAST CEMENTED REFRACTORY METAL CARBIDES HAVING IMPROVED SINTERED DENSITY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to thin cemented refractory metal carbide articles having at least two uneroded formed surfaces, and also relates to thin flexible unsintered articles of carbide and cementing metal particles suspended in an organic matrix and to a tape casting process for producing such sintered and unsintered articles.

2. Prior Art

Cemented refractory metal carbides are noted for their hardness and wear resistance and have wide application as wear resistant surfaces or components thereof. Such surfaces are sometimes formed by coating, for example by flame spraying a powder onto a substrate. In many applications, however, the wear surface is not amenable to formation by coating, for example where it is an internal surface of a pump, pipe, conveyer, reactor, etc. In these instances, thin carbide wear resistant surfaces have been formed by machining unsintered consolidated powders produced by extrusion or pressing, followed by sintering and finishing. Such operations tend to be time consuming and wastive of material, not only through erosion of the surfaces by machining, but also through breakage of the fragile unsintered parts. Furthermore, in some instances this fragility together with the complexity of the final desired shape requires machining of the sintered carbide article, which is extremely difficult due to the inherent hardness of the carbide particles.

In the U.S. Patent application Ser. No. 418,397, filed Nov. 23, 1973, now abandoned and assigned to the present assignee, there is described a technique for producing thin hard sintered articles such as cemented carbides without appreciable machining the technique involving tape casting thin sheets from a slurry, and forming and sintering these sheets.

While the above technique is felt to represent a significant advance in the art, enabling convenient and relatively cheap fabrication of thin hard articles, nevertheless the strength and wear resistance of these articles is sometimes inadequate for the most demanding applications.

It is therefore felt that further improving the strength and wear resistant properties of these articles would be a further advance in the art.

SUMMARY OF THE INVENTION

In accordance with the invention, it has been discovered that in the formation of thin cemented refractory metal carbide articles by tape casting a slurry containing an inorganic portion including carbide and cementing constituents and an organic portion including plasticizing and binder resin constituents, followed by forming and sintering the cast tapes or sheets, the porosity of the sintered article may be reduced by the use of ingredients in the organic portion of the slurry which can be completely removed without the substantial formation of carbonaceous residue. Thus, in accordance with one embodiment, the invention provides a cemented carbide article having a predetermined configuration including at least one portion having a thickness of from about 0.004 inches to about 0.08 inches defined by at least two uneroded formed surfaces and characterized by having porosities of the A-type, B-type and C-type each 3 or below as defined by ASTM specification #B-276-54.

In accordance with another embodiment, the invention further provides a self-supporting flexible tape or sheet of a composition comprising from about 85 to about 97 weight % of an inorganic portion consisting essentially of discrete particles of one or more refractory metal carbides and particles of one or more lower melting metallic cementers or binders, and from about 3 to 15 weight % of an organic portion consisting essentially of an organic plasticizer, an organic thermoplastic resin, and a deflocculant.

In a further embodiment, the invention provides the process whereby flexible articles of inorganic particles embedded in an organic matrix and cemented refractory metal carbide articles are produced, comprising forming a relatively uniform mixture of the inorganic and organic portions of the composition together with a solvent for the organic portion, in critical relationships. Thereafter, the mixture is cast in the form of a sheet or tape and the solvent evaporated. The resulting self-supporting flexible material can thereafter be heated to temperatures necessary to remove the solid organic constituents and form the cemented carbide article.

As used herein the term refractory metal cemented carbide means a unitary body consisting of discrete particles of from about 75 to 97 weight percent of a refractory metal carbide cemented together, usually by liquid phase sintering, with from about 3 to 25 weight percent of a lower melting metallic binder, normally one of the iron group metals. A typical cemented carbide would be tungsten carbide cemented with from 6 to 12 percent by weight of cobalt. Low melting alloys may also be used as the cementing phase. For example, a group known generically as brazing alloys may be used for this purpose in some applications.

As herein, the terms plasticizer, thermoplastic resin and deflocculant refer to materials which upon heating at relatively high temperatures, for example at temperatures below those at which cemented refractory metal carbides are formed, can be removed from the cast composition without the substantial formation of carbonaceous residues. Thus for example, the term thermoplastic resin as used herein may necessarily exclude certain resins conventionally thought of as thermoplastic resins, and conversely may necessarily include certain resins conventionally thought of as thermosetting resins.

As used herein, the term self-supporting means a material which retains its shape indefinitely free of external support.

For a better understanding of the present invention, together with other and further objects, advantages and capabilities thereof, reference is now made to the following disclosure and appended claims in connection with the above description and some of the aspects of the invention.

DETAILED DESCRIPTION OF THE INVENTION

Materials which benefit from the teachings of this invention are the cemented refractory metal carbides which are produced by mixing particles of a refractory metal carbide, for example, TiC, ZrC, HfC, VC, NbC, TaC, MoC, and WC, with particles of a material which can be melted at a temperature appreciably below the melting point of the carbide material, for example from about 200 to 1300° C lower, so that upon heating above the melting point of the lower melting metal it consolidates the mixture by wetting, dissolving, and adhering to the discrete carbide particles and upon cooling solidifies to bind the carbide particles together into a unitary structure. This heating must be carried out in a nonoxidizing atmosphere, for example in a neutral or reducing atmosphere such as vacuum, nitrogen, hydrogen etc., in order to prevent alterations in the stoichiometry and/or structure of the carbide particles or cementing matrix. For purposes of the invention refractory metals are those having melting points of 1600° C or above.

To produce the products of this invention from 85 to 97 weight percent of the desired inorganic cemented carbide forming materials are mixed in powder form with from about 3 to 15 weight percent of an organic portion consisting essentially of from about 50 to 90 weight percent of an organic plasticizer, from about 10 to 50 weight percent of a thermoplastic resin, and from 1 to 3 weight percent of a deflocculating agent.

Dialkyl and akyl phthalate plasticizers have been found to provide sufficient flexibility to the cast tape while retaining suitable strength. Particularly suitable plasticizers are the dialkyl phthalates such as dioctyl phthalate, diethyl phthalate, dibutyl phthalate, diamyl phthalate and the like.

The thermoplastic resin may be of the cellulose type or vinyl type. Cellulose resins can be of the cellulose propionate and cellulose nitrate type. These are sold by their generic names by suppliers such as Hercules Incorporated, Eastman Chemical Products and Celanese Plastics Company. One resin which has been found to be particularly suitable is polyvinyl butyryl sold under a variety of tradenames by different suppliers such as Butvar by Shawinigan Resins, Saflex by Monsanto Company and Butacite by E. I. Dupont.

In order to prevent flocculation or agglomeration of the carbide and binder particles, a deflocculating agent is used, such as gelatin, fish oil and the like.

All of the constituents of the organic portion of the composition should be completely removable without substantial formation of carbonaceous residue at a relatively low temperature, for example below about 800° C, but in any event below about 1,000° C, above which substantial sintering of the cementing metal constituent and the carbide particles could occur.

In order to prepare a tape casting slurry, the organic constituents are normally dissolved in one or more organic solvents and the inorganic constituents are slurred in this solution. The solvent chosen generally will have a low boiling point so that it can be easily removed subsequent to casting in order to form the self-supporting flexible tape or sheet. Solvents having a boiling point below about 150° C are suitable, such as for example, toluene and methanol. In general the amount of solvent needed to form a tape casting slurry of workable viscosity is from about 2 to 3 times the weight of the solid organic constituents. A suitable casting viscosity may generally be obtained when the slurry comprises from about 60 to 94 weight % of the inorganic portion, from about 2 to 10 weight % of the solid organic portion and from about 4 to 30 weight % of the organic solvent. The material cast from this slurry normally has a thickness after the solvent has been evaporated of from about 0.006 to about 0.1 inch. This flexible self-supporting material can be dewaxed by heating in a non-oxidizing atmosphere to the desired temperatures up to 1000° C to remove the remaining solid organics and then to a higher temperature to melt the metallic binder and form the cemented carbide containing the carbide particles relatively uniformly dispersed in the metallic binder and exhibiting a porosity in general below about $A_2$.

In dewaxing, it has been found to be advantageous to first heat to an intermediate temperature, for example, between 250° C and 350° C to allow substantial degassing, and then heat to a higher temperature, for example, between 500° C and 900° C to cause substantially complete removal of the organic constituents.

To more fully illustrate the invention, the following detailed examples are presented. All parts, proportions, and percentages are by weight unless otherwise indicated.

EXAMPLE I

Four different solutions are prepared having the compositions designated as A, B, C and D in Table I below.

TABLE I

COMPOSITION OF CASTING SOLUTIONS

| | A | B | C | D |
|---|---|---|---|---|
| Butvar: Vinyl-type thermoplastic resin Monsanto B-76, g. | 240 | 224 | 314 | 314 |
| DOP: Di-2-ethylhexylphthalate Union Carbide Flexol Plasticizer, ml | 110 | 140 | 140 | 140 |
| TSR: Amine-type thermo-setting resin Reichold 21-511 Beckamine, ml | 80 | 90 | — | — |
| Toluene: Industrial Grade Mallinckrodt, ml | 1000 | 900 | 900 | 1017 |
| Methanol: Industrial Grade Mallinckrodt, ml | 300 | 250 | 250 | 283 |
| Fish Oil: Ensign Z-3 Haynie, ml | 15 | 15 | 15 | 15 |

Compositions A and B contain an amine type thermosetting resin, in accordance with prior art teachings. Compositions C and D do not contain any thermosetting resin but contain proportionately higher amounts of thermoplastic resin to compensate for the absence of any thermosetting resin.

EXAMPLE II

About 285 ml of each of the casting solutions listed in Table I are slurried with about 1,000 grams of a powder containing about 94% tungsten carbide particles and about 6% cobalt particles. The slurries are cast onto a Mylar substrate using a doctor blade technique to achieve a thickness after solvent evaporation of about 0.019 inches. The resulting sheet is flexible and is thereafter dewaxed to remove the organic material by gradual heating to about 300° C to 350° C, soaking within this temperature range for about 7 to 8 hours, followed by gradual heating to about 850° C and soaking at this temperature for about 7 to 8 hours, followed by gradual cooling, the entire dewaxing cycle requiring about 5 days to complete. The dewaxed sheets are thereafter liquid sintered by heating about the melting temperature of cobalt, at about 1435° C, for about 1 to 2 hours in a reducing atmosphere or vacuum. The resulting cemented carbide articles are then measured for A-type, B-type and C-type porosity in accordance with ASTM specification #B-276-54. In accordance with the invention, each of these porosity types should be 3 or below. The articles are also analyzed for free carbon content. The results are presented below in Table II.

TABLE II

| Casting Solution Used (from Table I) | A | B | C | D |
|---|---|---|---|---|
| Porosity | "too high to be measured" | $A_5B_2$ | $A_{1-2}$ | $A_{1-2}$ |
| Free Carbon analysis (weight %) of sintered article | 0.58 | 0.08 | <0.01 | <0.01 |

As may be seen from Table II, prior art compositions A and B resulted in cemented carbide articles having appreciably higher porosities and residual free carbon contents than did articles produced from compositions C and D in accordance with the invention. While not completely understood, it is felt that the absence of thermosetting resin in compositions C and D lead to the absence of carbonaceous residues in the dewaxed flexible sheet and that the subsequent lower porosity was due to the absence of such carbonaceous residue in the flexible sheet prior to sintering.

In addition to reducing porosity, eliminating the thermosetting resin resulted in improved release of the tape from the Mylar substrate. With thermosetting resin it had to be lifted at the edges with a razor blade and, even then, it would not come off smoothly. Without thermosetting resin it peeled off readily by hand.

While there has been shown and described what are at present considered the preferred embodiments of the invention, it will be obvious to those skilled in the art that various changes and modifications may be made therein without departing from the scope of the invention as defined by the appended claims.

What is claimed is:

1. A cemented refractory metal carbide article consisting essentially of from about 75 to 97 weight % of discrete particles of at least one refractory metal carbide distributed in a matrix of from about 3 to about 25 weight % of a lower melting binder metal, said article having a predetermined configuration including at least a portion having a thickness of from about 0.004 inch to about 0.08 inch defined by at least 2 uneroded formed surfaces, characterized in that said article exhibits A-type, B-type and C-type porosities in accordance with ASTM specification #B-276-54 of up to and including $A_3$, $B_3$ and $C_3$.

2. An article according to claim 1 wherein at least a portion of said refractory metal carbide is tungsten carbide.

3. An article according to claim 2 wherein at least a portion of said lower melting binder metal is at least one iron group metal selected from the group consisting of iron, cobalt, an nickel.

4. A self-supporting flexible article having a composition consisting essentially of from about 85 to about 97% by weight of an inorganic portion consisting essentially of discrete particles of a refractory metal carbide, and a lower melting binder metal suspended in from about 3 to about 15 weight % of an inorganic portion consisting essentially of an organic plasticizer, a thermoplastic resin and a deflocculant, and having a thickness from about 0.006 to about [0.01] *0.1* inch, characterized in that said organic portion upon heating to a temperature up to about 1000° C is substantially completely removed from the article.

5. An article according to claim 4 wherein at least a portion of said refractory metal carbide is tungsten carbide.

6. An article according to claim 4 wherein at least a portion of the lower melting binder metal is at least one iron group metal selected from the group consisting of iron, cobalt and nickel.

7. An article according to claim 4 wherein said plasticizer is a phthalate derivative, and said binder resin is a thermoplastic resin of the vinyl type.

8. A process for producing a flexible self-supporting article containing discrete particles of a refractory metal carbide, and a lower melting binder metal suspended in an organic portion, the process comprising:

(a) forming a slurry consisting essentially of from about 60 to 94 weight % of an inorganic portion consisting essentially of the carbide particles and particles of the lower melting binder metal, from about 2 to about 10 weight % of a solid organic portion consisting essentially of at least one plasticizer, at least one thermoplastic binder resin and at least one deflocculant, and from about 4 to about 30 weight percent of an organic solvent for said solid organic portion, (b) casting said slurry in the form of a relatively thin sheet, and (c) evaporating said solvent from said mixture to thereby form a flexible self-supporting article, characterized in that said organic portion upon heating to a temperature up to about 1000° is substantially completely removed from the article.

9. Process according to claim 8 wherein at least a portion of said refractory metal carbide is tungsten carbide.

10. Process according to claim 8 wherein at least a portion of said lower melting binder metal is at least one metal selected from the iron group metals iron, cobalt, and nickel.

11. Process according to claim 8 wherein said plasticizer is a phthalate derivative, and said binder resin is a thermoplastic resin of the vinyl type.

12. A process according to claim 8 wherein said organic solvent has a boiling point below about 150° C.

13. Process according to claim 12 wherein said solvent comprises at least one organic solvent selected from the group consisting of methanol and toluene.

* * * * *